United States Patent
Morita et al.

(10) Patent No.: US 11,458,934 B2
(45) Date of Patent: Oct. 4, 2022

(54) CLEANING NOZZLE UNIT AND ON-VEHICLE CAMERA UNIT

(71) Applicant: CLARION CO., LTD., Saitama (JP)

(72) Inventors: Shinji Morita, Saitama (JP); Hideyuki Tamura, Saitama (JP); Tetsuo Hata, Saitama (JP); Nobuhiro Sato, Saitama (JP); Nobuhiko Mochiji, Saitama (JP); Hiroshi Shojima, Saitama (JP); Norihiko Nakano, Saitama (JP); Hiroshi Aoki, Saitama (JP); Yukari Akiyama, Saitama (JP); Naohiro Noguchi, Saitama (JP); Hiroko Tsutsumi, Saitama (JP)

(73) Assignee: CLARION CO., LTD., Saitama (JP)

( * ) Notice: Subject to any disclaimer, the term of this patent is extended or adjusted under 35 U.S.C. 154(b) by 211 days.

(21) Appl. No.: 16/819,599

(22) Filed: Mar. 16, 2020

(65) Prior Publication Data
US 2020/0307524 A1    Oct. 1, 2020

(30) Foreign Application Priority Data

Mar. 26, 2019    (JP) .............................. JP2019-058527

(51) Int. Cl.
*B60S 1/56* (2006.01)
*B05B 7/04* (2006.01)
(Continued)

(52) U.S. Cl.
CPC .............. *B60S 1/56* (2013.01); *B05B 7/0483* (2013.01); *B60S 1/52* (2013.01); *B60S 1/54* (2013.01)

(58) Field of Classification Search
CPC .................................................. B05B 7/0483
See application file for complete search history.

(56) References Cited

U.S. PATENT DOCUMENTS

| 5,657,929 A | * | 8/1997 | DeWitt | ..................... B60S 1/54 |
| | | | | 239/284.2 |
| 8,087,122 B2 | * | 1/2012 | Martin | .................... B60S 1/603 |
| | | | | 15/313 |

(Continued)

FOREIGN PATENT DOCUMENTS

| JP | 2012-132988 A | 7/2012 |
| WO | 2014/010580 A1 | 1/2014 |

OTHER PUBLICATIONS

Extended European Search Report issued for the counterpart European Patent Application No. 20164155.2 dated Aug. 6, 2020.

*Primary Examiner* — Spencer E. Bell
*Assistant Examiner* — Omair Chaudhri
(74) *Attorney, Agent, or Firm* — IP Business Solutions, LLC

(57) ABSTRACT

In a cleaning nozzle unit including an inner liquid passage guiding a cleaning solution, an inner air passage feeding air to an outlet of the inner liquid passage, and an injection port that mixes the cleaning solution guided by the inner liquid passage and the air fed by the inner air passage and injects a mixture of the cleaning solution and the air to a surface of an object, a plurality of the injection ports are provided, are disposed at predetermined intervals and inject the mixtures in directions such that the mixtures hits each other in the surface at a substantially predetermined angle in a front view of the surface.

4 Claims, 8 Drawing Sheets

(51) Int. Cl.
*B60S 1/52* (2006.01)
*B60S 1/54* (2006.01)

(56) References Cited

U.S. PATENT DOCUMENTS

| | | | |
|---|---|---|---|
| 2001/0054655 A1* | 12/2001 | Berg | B60S 1/54 239/351 |
| 2008/0308649 A1* | 12/2008 | Le Louarn | B64C 1/1453 239/171 |
| 2013/0092758 A1* | 4/2013 | Tanaka | B60S 1/56 239/284.1 |
| 2014/0060582 A1* | 3/2014 | Hartranft | H04N 7/185 348/148 |
| 2015/0151722 A1* | 6/2015 | Gokan | H04N 5/2251 134/198 |
| 2015/0166021 A1 | 6/2015 | Gokan et al. | |
| 2015/0203077 A1* | 7/2015 | Gokan | H04N 5/2252 134/102.2 |
| 2016/0339875 A1* | 11/2016 | Ina | B60S 1/522 |
| 2019/0086773 A1* | 3/2019 | Okamura | B60S 1/56 |
| 2020/0114880 A1* | 4/2020 | Hahn | B60S 1/52 |
| 2020/0180566 A1* | 6/2020 | Saito | B60S 1/56 |
| 2020/0238955 A1* | 7/2020 | Walsøe | B60S 1/56 |
| 2022/0105902 A1* | 4/2022 | Adachi | B60S 1/48 |

* cited by examiner

CLEANING NOZZLE UNIT AND ON-VEHICLE CAMERA UNIT

INCORPORATION BY REFERENCE

The present application claims priority under 35 U.S.C. § 119 to Japanese Patent Application No. 2019-058527 filed on Mar. 26, 2019. The content of the applications is incorporated herein by reference in its entirety.

BACKGROUND OF THE INVENTION

Field of the Invention

The present invention relates to a cleaning nozzle unit, and an on-vehicle camera unit.

Description of the Related Art

As an art of cleaning a lens of an on-vehicle camera unit, there have been known International Publication No. WO 2014/010580 and Japanese Patent Laid-Open No. 2012-132988.

International Publication No. WO2014/010580 discloses a system that washes dirt adhering to a lens to such an extent as not to impair a sensing function by the on-vehicle camera, by providing nozzles on an upper side of the lens of the on-vehicle camera that senses a vehicle rear direction, and injecting compressed air and a cleaning solution from the nozzles.

Japanese Patent Laid-Open No. 2012-132988 discloses an art of using air that is controlled to be conditioned by an air-conditioning device for air used in cleaning the lens of an on-vehicle camera in a configuration where nozzles are provided on an upper side of the lens of the on-vehicle camera.

Patent Literature 1

International Publication No. WO 2014/010580

Patent Literature 2

Japanese Patent Laid-Open No. 2012-132988

SUMMARY OF THE INVENTION

In cleaning from the nozzles provided on the upper side of the lens as in the arts of International Publication No. WO 2014/010580, and Japanese Patent Laid-Open No. 2014-132988, dirt easily remains on a lower side of the lens because the lens is spherical.

In order to solve the problem, it is conceivable to provide a nozzle in a position where the nozzle protrudes so as not to produce a shadow on the surface of the spherical lens. However, in doing so, there arise new problems that the nozzle enters an angle of view that is used for sensing, and the nozzle is excessively protruded from a vehicle body.

Further, a configuration can be also considered, in which a nozzle for cleaning dirt on the lower side of the lens is separately added to the lower side of the lens, but in doing so, there arise new problems such as increase in the number of components for cleaning, complication of the structure, and increase in size.

Further, in the art of Japanese Patent Laid-Open No. 2012-132988, air used in cleaning the lens of the on-vehicle camera is air that is controlled to be conditioned by the air-conditioning device, and therefore, there is also the problem that pressure of air injected from the nozzles is relatively low. Therefore, in cleaning the on-vehicle camera mounted in front of the vehicle, pressure of air that is injected is defeated by pressure of traveling wind, and the lens may not be cleaned normally. Further, since the injected pressure is low, an ability to eliminate clogging occurring to the nozzles also becomes low, and even mild clogging cannot sometimes be cleaned.

An aspect of the present invention has an object to provide a cleaning nozzle unit and an on-vehicle camera unit which are capable of enhancing cleaning performance.

An aspect of the present invention is a cleaning nozzle unit including an inner liquid passage guiding a cleaning solution, an inner air passage feeding air to an outlet of the inner liquid passage and an injection port that mixes the cleaning solution guided by the inner liquid passage and the air fed by the inner air passage and injects a mixture of the cleaning solution and the air to a surface of an object, wherein a plurality of the injection ports are provided, are disposed at predetermined intervals and inject the mixtures in directions such that the mixtures hits each other in the surface at a substantially predetermined angle in a front view of the surface.

An aspect of the present invention is the above described cleaning nozzle unit, wherein in a case that injection ports are installed in an on-vehicle camera, the object is a lens of the on-vehicle camera, the injection ports are disposed at angles so that the mixtures hits each other at an apex of the lens in a spherical shape.

An aspect of the present invention is the above described cleaning nozzle unit, wherein a number of the injection ports is two, and an angle formed by the two injection ports is 50 degrees or more, and less than 180 degrees seen from the apex of the lens.

An aspect of the present invention is the above described cleaning nozzle unit, including a lid body that closes the outlet of the inner liquid passage and opens the outlet of the inner liquid passage by elastically deforming by hydraulic pressure of the cleaning solution when the cleaning solution is fed to the inner liquid passage.

An aspect of the present invention provides an on-vehicle camera unit, including an on-vehicle camera having a spherical lens, and the cleaning nozzle unit according to any one of the above described aspects.

According to an aspect of the present invention, cleaning performance can be enhanced.

DETAILED DESCRIPTION OF THE PREFERRED EMBODIMENT

Hereinafter, an embodiment of the present invention will be described with reference to the drawings.

Figure 1:
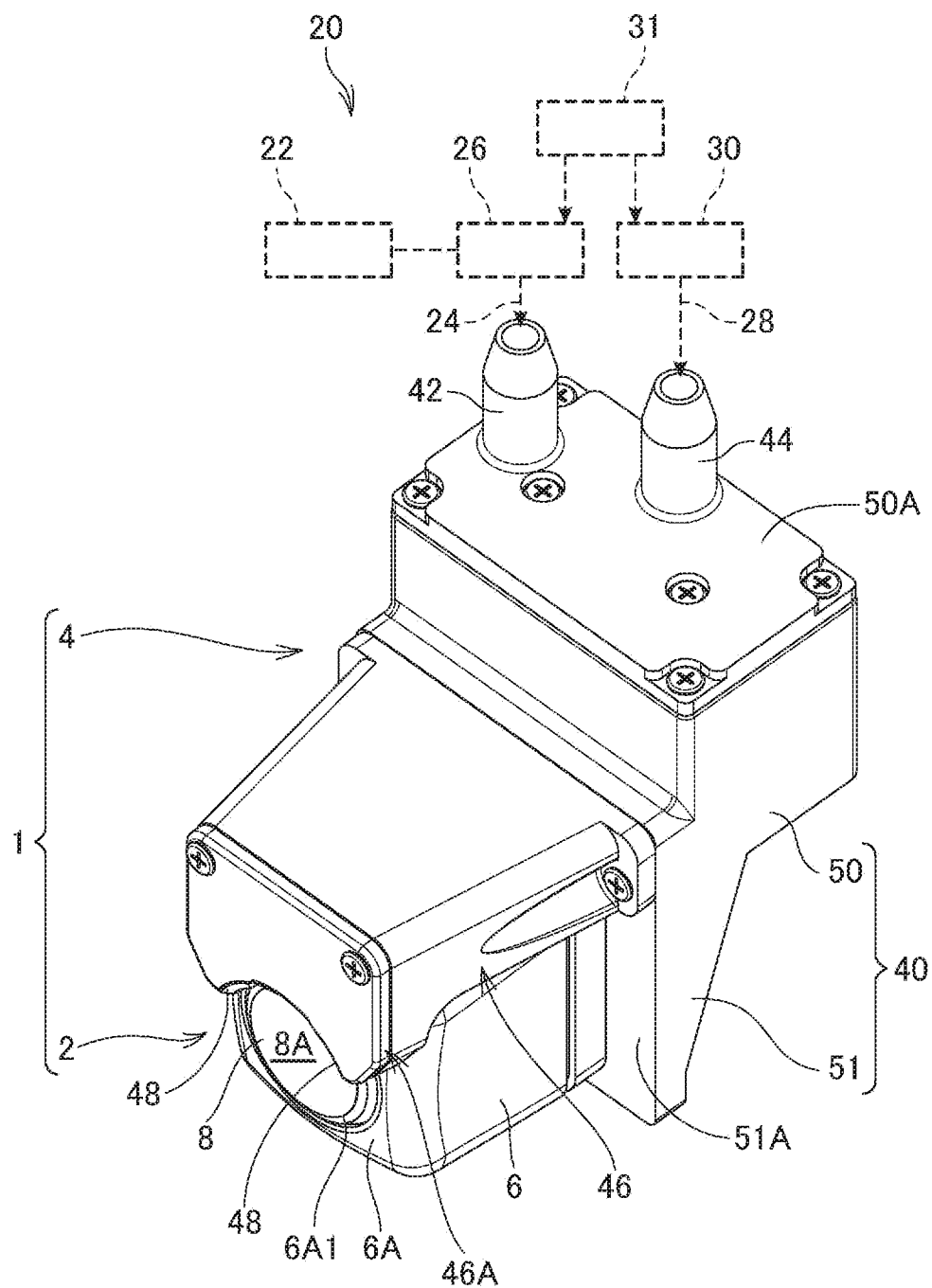
FIG. 1 is a perspective view illustrating a configuration of an on-vehicle camera unit.
Figure 2:
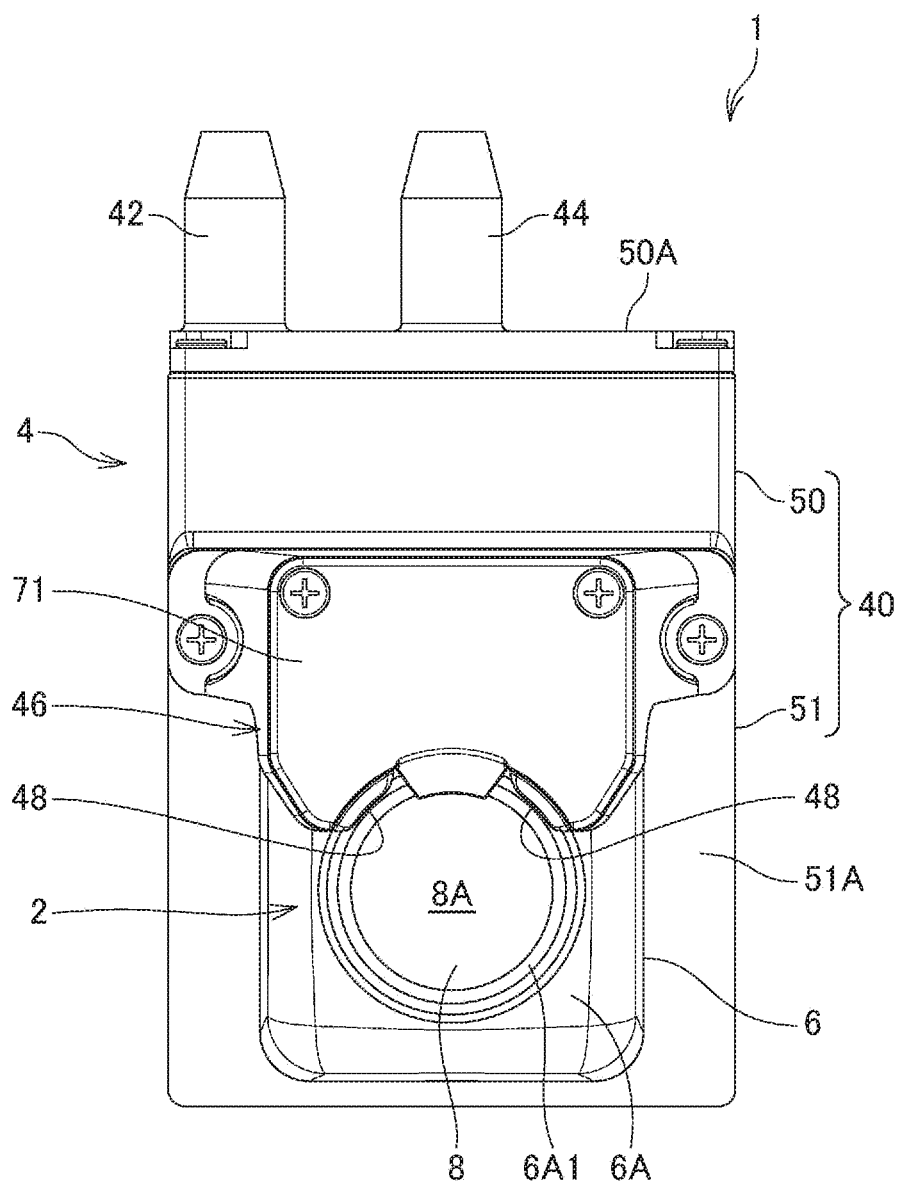
FIG. 2 is a front view of the on-vehicle camera unit.

FIG. 1 is a perspective view illustrating a configuration of an on-vehicle camera unit 1, and FIG. 2 is a front view of the on-vehicle camera unit 1.

As illustrated in FIG. 1 and FIG. 2, the on-vehicle camera unit 1 is a unit including an on-vehicle camera 2 that captures video of surroundings of a vehicle, and a cleaning nozzle unit 4 for cleaning the on-vehicle camera 2, and the on-vehicle camera unit 1 is installed in front, in rear, at a left side, at a right side, and the like of a vehicle body of the vehicle in a states exposed outside of the vehicle. Hereinafter, a case is illustrated, in which the on-vehicle camera unit 1 is disposed in front or in rear of the vehicle body, and traveling wind at the time of vehicle traveling mainly hits the on-vehicle camera unit 1 from a front.

The on-vehicle camera 2 includes a camera body case 6 and a lens 8. The camera body case 6 forms a substantially rectangular parallelepiped shape, in which an imaging element that is an optical sensor and various electric circuits are housed. The lens 8 is mounted to a front face 6A of the camera body case 6, is an optical element forming an image on the capturing element, and a spherical lens that is one of convex lenses is used in the present embodiment.

In the lens 8, a surface 8A of the lens 8 has a water repellency due to water repellent coating. Further, in the camera body case 6, a lens contact portion 6A1 contacting at least the lens 8, of the front face 6A, has hydrophilicity by being formed from a hydrophilic material (for example, a hydrophilic resin). When the lens 8 is wetted by rain or the like, water smoothly moves from the surface 8A having water repellency to the lens contact portion 6A1 having hydrophilicity, and thus favorable drainage of the surface 8A is realized.

Further, the vehicle is loaded with a cleaning device 20 that cleans the lens 8 of the on-vehicle camera 2 by injecting a cleaning solution in a mist state (a mixture) (hereinafter, referred to as "cleaning solution mist 47" (see FIG. 6)) at appropriate timings during stoppage and during travel, and the cleaning nozzle unit 4 is one component of the cleaning device 20.

As illustrated in FIG. 1, the cleaning device 20 includes a cleaning solution storage tank 22 storing a cleaning solution, a cleaning solution pump 26 feeding the cleaning solution of the cleaning solution storage tank 22 to the cleaning nozzle unit 4 through a cleaning solution tube 24, an air pump 30 feeding compressed air to the cleaning nozzle unit 4 through an air tube 28, and a control device 31 controlling the cleaning solution pump 26 and the air pump 30, in addition to the cleaning nozzle unit 4.

The cleaning nozzle unit 4 is a unit configured to be connectable to the cleaning solution tube 24 and the air tube 28, and includes a unit body 40 and a nozzle portion 46.

The unit body 40 has a body portion 50, and a mounting portion 51, and the body portion 50 and the mounting portion 51 are integrally molded. The body portion 50 forms a substantially rectangular parallelepiped shape, and on a top surface 50A thereof, a cleaning solution connector 42 that is a connection terminal of the cleaning solution tube 24, and an air connector 44 that is a connection terminal of the air tube 28 are vertically provided. Further, inside of the body portion 50, a tank that communicates with the cleaning solution connector 42 and stores the cleaning solution, and a chamber (air chamber) that communicates with the air connector 44 and serves as a buffer for compressed air are provided. A mounting portion 51 has a flat mounting face 51A rectangular in plan view, on a front face side, and on the mounting face 51A, the above described on-vehicle camera 2 and the nozzle portion 46 are fixed by being screwed.

The nozzle portion 46 forms a substantially columnar shape of a length extending from the mounting face 51A to the surface 8A of the lens 8, and a plurality (two in the present embodiment) of injection ports 48 for injecting the cleaning solution mist 47 in a vicinity of the lens 8 are formed in a tip end portion 46A of the nozzle portion 46. The nozzle portion 46 is mounted to an upper side of the on-vehicle camera 2, and thereby the respective injection ports 48 are disposed to oppose each other on an upper side of the lens 8.

Figure 3:
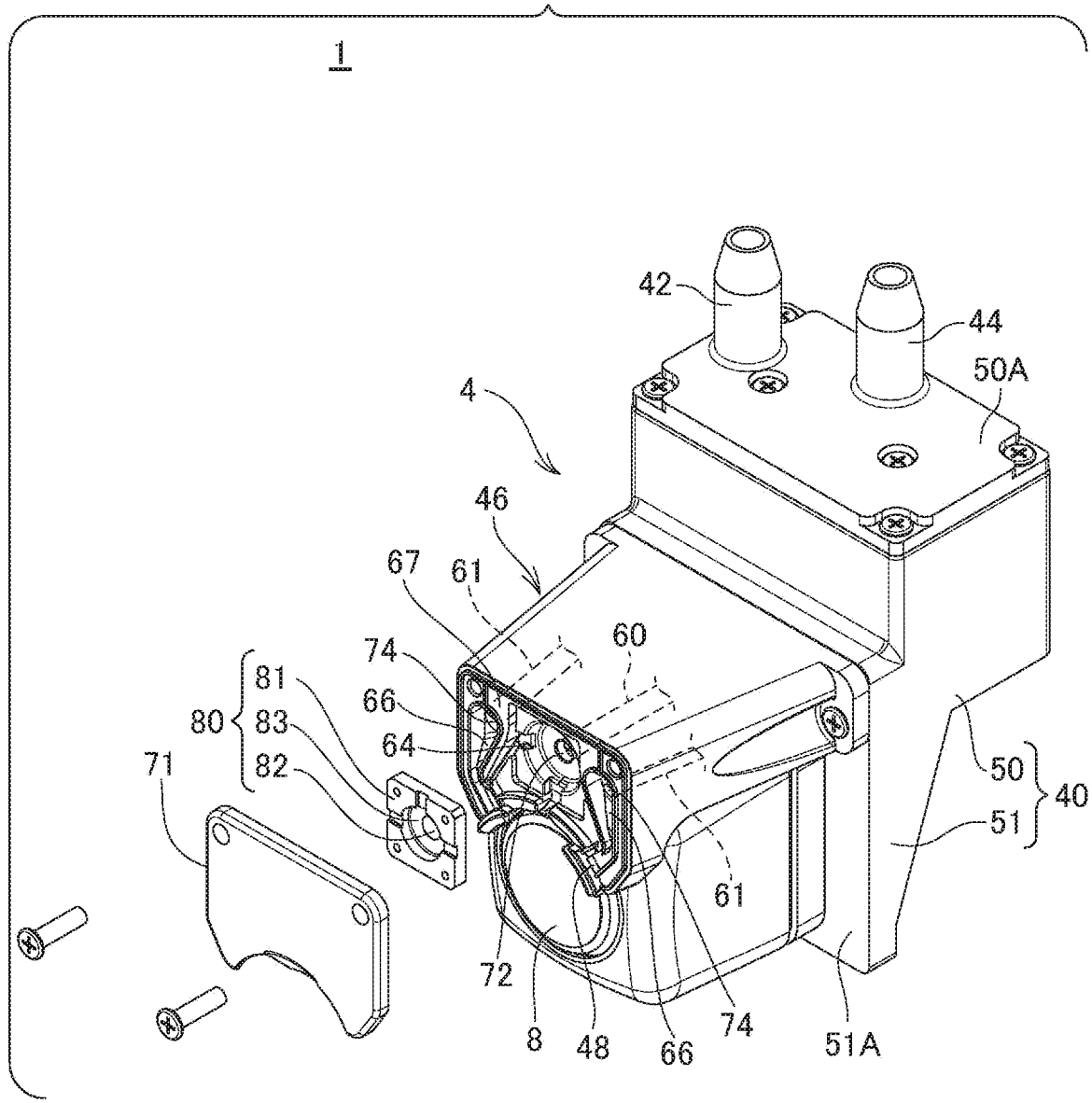
FIG. 3 is an exploded perspective view in which a tip end portion of a nozzle portion is exploded.
Figure 4:
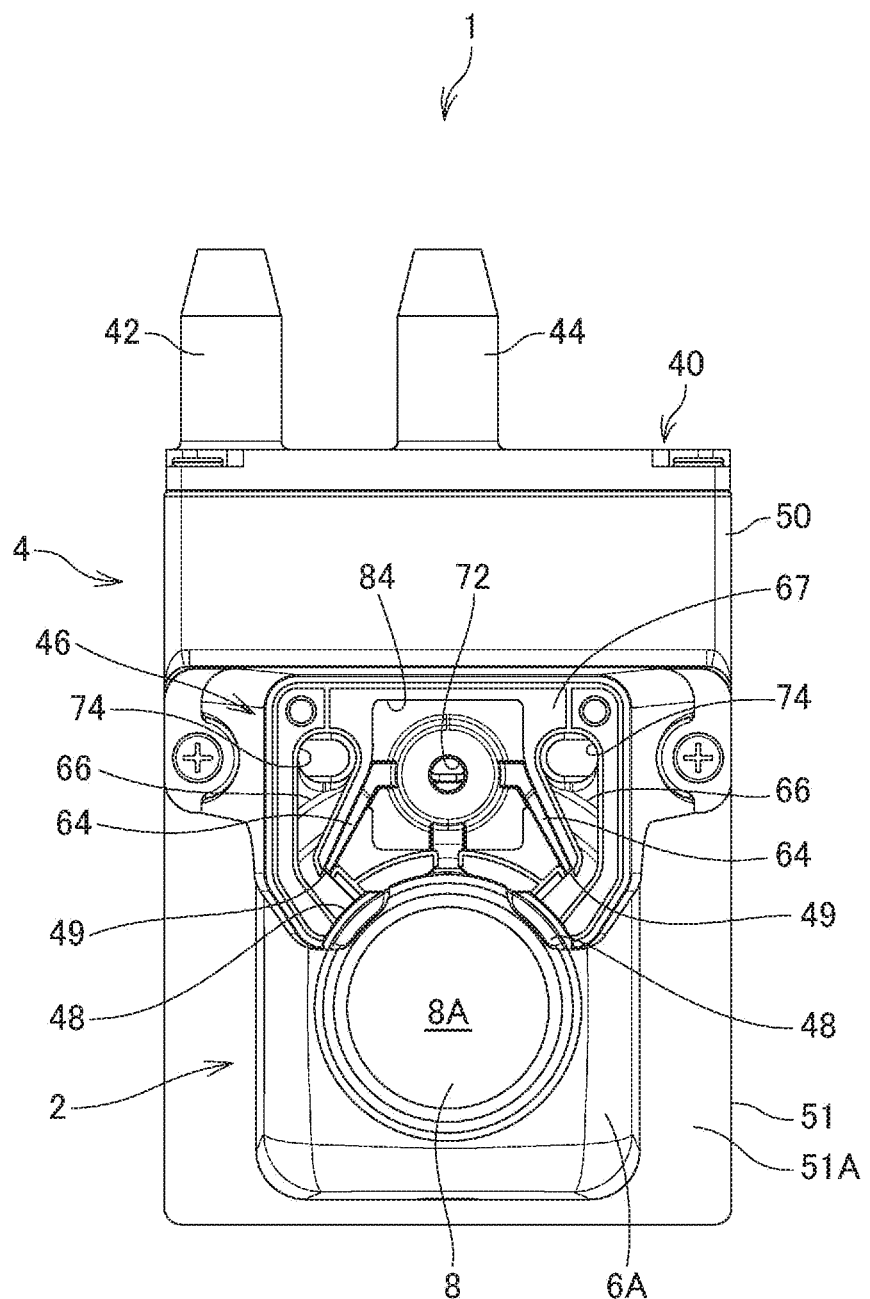
FIG. 4 is a front view of a state where a tip end cover is detached from the tip end portion of the nozzle portion.

FIG. 3 is an exploded perspective view in which the tip end portion 46A of the nozzle portion 46 is exploded, and FIG. 4 is a front view of a state in which a tip end cover 71 is detached from the tip end portion 46A of the nozzle portion 46. Further, FIG. 5 is a vertical sectional view of the on-vehicle camera unit 1.

Figure 5:
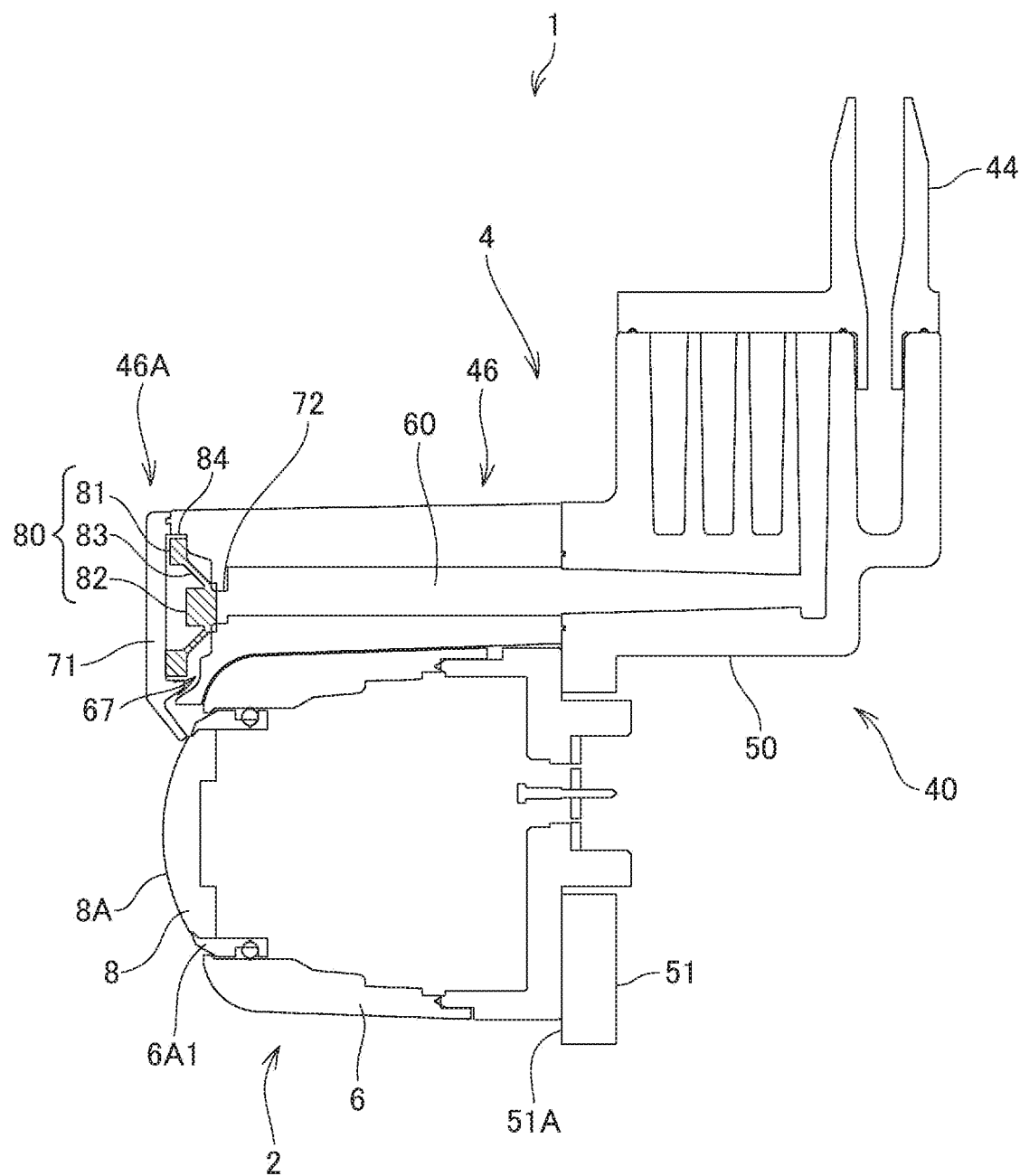
FIG. 5 is a vertical sectional view of the on-vehicle camera unit.

As illustrated in FIG. 5, inside of the nozzle portion 46, a single inner liquid passage 60 that guides a cleaning solution and two inner air passages 61 that guide the air, from the unit body 40 to the tip end portion 46A are formed toward the tip end portion 46A of the nozzle portion 46 from the unit body 40. In tip end face 67 of the tip end portion 46A, a single inner liquid passage outlet 72 that is an outlet of the inner liquid passage 60 is opened, and inner air passage outlets 74 that are outlets of the inner air passages 61 are opened on both sides of the inner liquid passage outlet 72 as illustrated in FIG. 4.

As illustrated in FIG. 5, the tip end face 67 forms a planar shape covered with the tip end cover 71, and within the plane, tip end liquid passages 64 connecting the inner liquid passage outlet 72 and the respective injection ports 48, and tip end air passages 66 connecting the inner air passage outlets 74 and the injection ports 48 in one to one correspondence are provided. The tip end liquid passage 64 and the tip end air passage 66 meet at a junction 49 before the injection port 48, the cleaning solution is brought into a mist state by mixing the cleaning solution and air in the junction 49, and the cleaning solution mist 47 is injected from the injection port 48.

The on-vehicle camera unit 1 is mounted to a vehicle in an orientation in which the nozzle portion 46 is located vertically above the on-vehicle camera 2. In the tip end face 67 of the nozzle portion 46, the respective injection ports 48 are provided vertically below the inner liquid passage outlet 72 and the inner air passage outlet 74, and the tip end liquid passage 64 and the tip end air passage 66 are respectively formed so that the cleaning solution and air flow down only vertically downward (that is, without providing a spot that guides the fluid vertically upward halfway through a path) to the injection port 48 from the corresponding inner liquid passage outlet 72 and inner air passage outlet 74. Further, the cleaning solution in the path of the tip end liquid passage 64 is caused to flow toward the injection port 48 by pressure of a pump (not illustrated), and the cleaning solution hardly remains in the path of the tip end liquid passage 64 after a cleaning operation.

Here, very small water droplets may remain on the surface 8A of the lens 8 after a cleaning operation. Therefore, the cleaning device 20 of the present embodiment is configured to blow away water droplets from the surface 8A by the control device 31 causing the air pump 30 to operate for executing a water droplet removal operation of spraying air to the surface 8A of the injection port 48 while stopping the cleaning solution pump 26. The control device 31 includes for example, CPU, ROM and RAM, and executes a control program stored in ROM or the like to control the cleaning solution pump 26 and the air pump 30.

Since, as described above, the cleaning solution hardly remains in the tip end liquid passage 64, a situation can be prevented, in which at a time of the water droplet removal operation, the cleaning solution remaining in the tip end liquid passage 64 is blown away together with air, and the cleaning solution newly adheres to the surface 8A. However, the inner liquid passage 60 internally provided in the nozzle portion 46 has a relatively long path length, and extends in a direction closer to a horizontal direction than a vertical direction in a vehicle installation state, so that the cleaning solution may remain in the inner liquid passage 60, and the cleaning solution is likely to be blown out together with air at the time of water droplet removal operation.

Therefore, in the present embodiment, in order to prevent outflow of the cleaning solution from the inner liquid passage 60 at the time of water droplet removal operation, a lid body 80 is provided in the inner liquid passage outlet 72 of the inner liquid passage 60, as illustrated in FIG. 3 and FIG. 5.

The lid body 80 closes the inner liquid passage outlet 72, and elastically deforms by hydraulic pressure and opens the inner liquid passage outlet 72, at a time of operation of the cleaning solution pump 26. At the time of water droplet removal operation, the lid body 80 inhibits outflow of the cleaning solution from the inner liquid passage 60, and therefore the cleaning solution of the inner liquid passage 60 is prevented from being blown out together with air. Further, even if the cleaning solution remains in the tip end liquid passage 64 directly after cleaning or the like, a path length of the tip end liquid passage 64 is short as compared with the inner liquid passage 60, and the amount of solution remaining in the tip end liquid passage 64 is very small. Therefore, at the time of water droplet removing operation, air in which the cleaning solution mixes is blown out only at first, and thereafter, air that includes no cleaning solution can be blown out quickly.

As illustrated in FIG. 3 and FIG. 5, the lid body 80 of the present embodiment includes a frame portion 81, a lid portion 82 that abuts on the inner liquid passage outlet 72 to close the inner liquid passage outlet 72, and a support portion 83 that supports the lid portion 82 at the frame portion 81, and the frame portion 81, the lid portion 82 and the support portion 83 are integrally molded from a resin material (for example, silicon rubber or the like) having elasticity.

As illustrated in FIG. 3, in the tip end face 67, an engaging recessed portion 84 is formed, as illustrated in FIG. 5, and at a time of mounting the lid body 80, the tip end cover 71 is fixed in a state where the frame portion 81 is fitted in the engaging recessed portion 84, and thereby the frame portion 81 is pressed to the engaging recessed portion 84 by the tip end cover 71. Further, in this state, the lid portion 82 is brought into a state where the lid portion 82 is pressed against the inner liquid passage outlet 72 by an elastic force. The support portion 83 easily elastically deforms by being formed to be thin in thickness as compared with the frame portion 81 and the lid portion 82, the lid portion 82 quickly separates from the inner liquid passage outlet 72 by the support portion 83 easily elastically deforming by hydraulic pressure following operation of the cleaning solution pump 26, and the inner liquid passage outlet 72 is opened.

The structure in which the inner liquid passage outlet 72 is closed with the lid body 80 that elastically deforms is adopted in this way, outflow of the cleaning solution from the inner liquid passage 60 can be prevented at the time of water droplet removal operation at low cost with simple assembly.

Next, cleaning of the lens 8 by the cleaning nozzle unit 4 will be described in detail.

Figure 6:
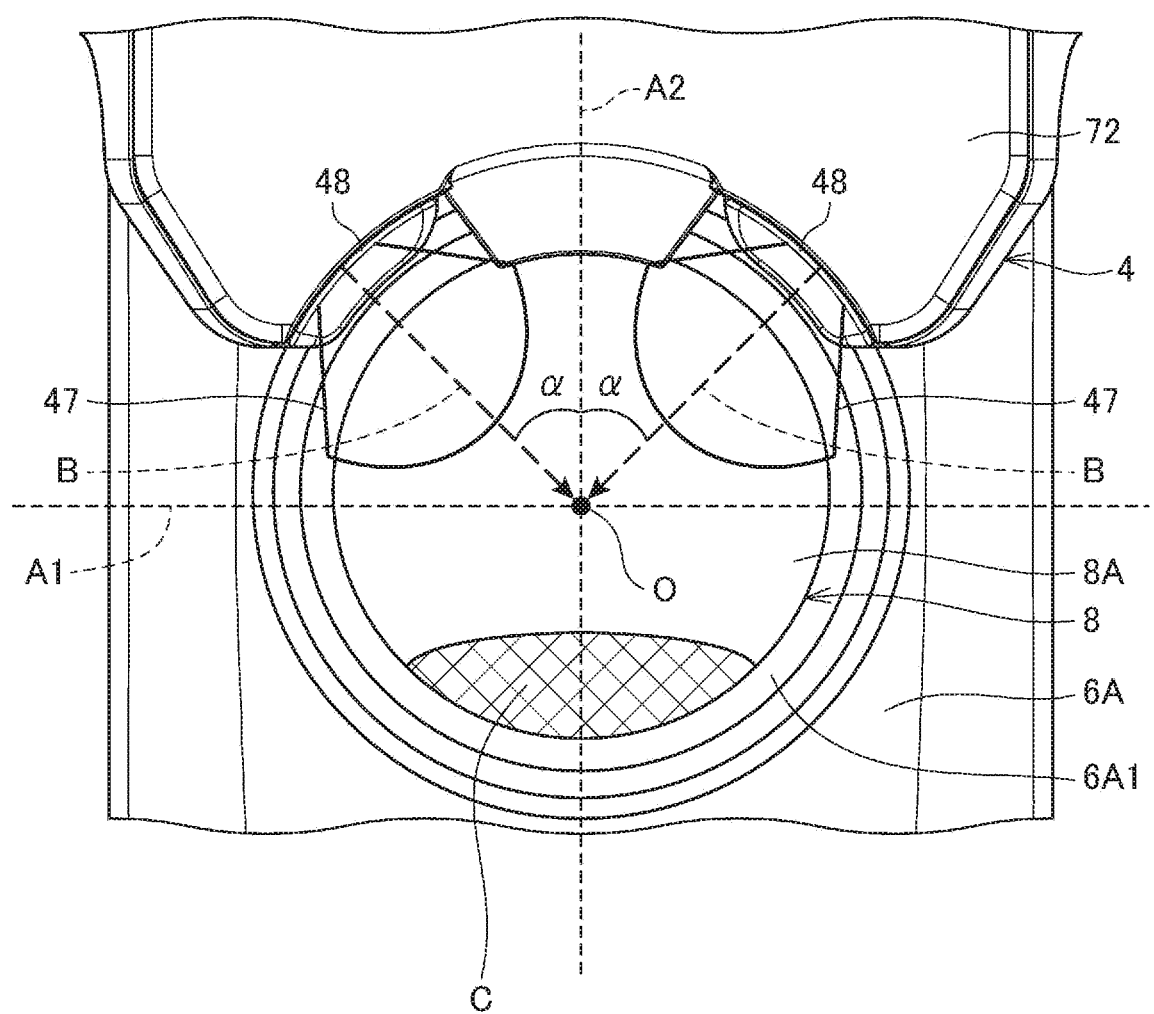
FIG. 6 is a front view schematically illustrating an injection state of cleaning solution mist.
Figure 7:
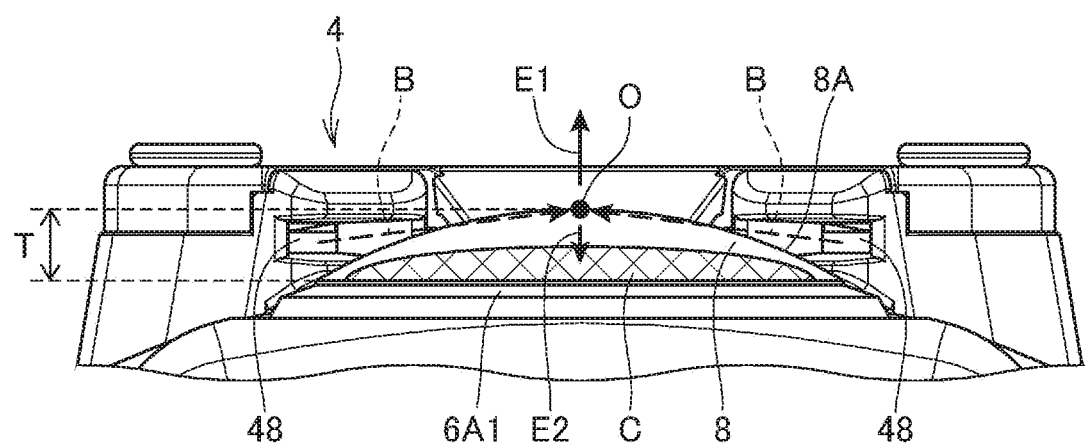
FIG. 7 is a view of an injection port of a cleaning nozzle unit seen from a lower side of a lens.
Figure 8:
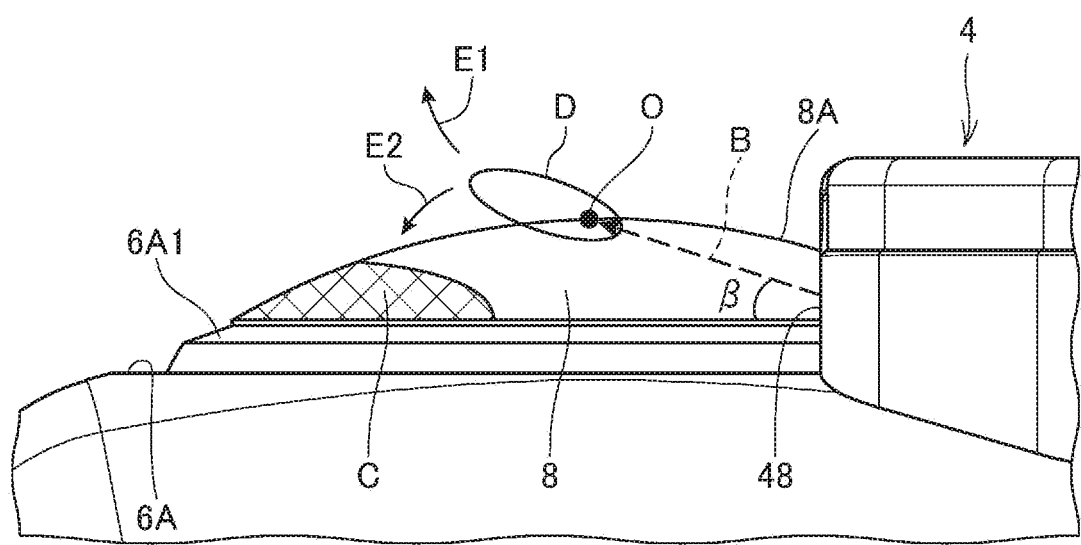
FIG. 8 is a view of a vicinity of the injection port of the cleaning nozzle unit seen from a side face of the lens.

FIG. 6 is a front view schematically illustrating an injection state of the cleaning solution mist 47. FIG. 7 is a view of the injection port 48 of the cleaning nozzle unit 4 seen from a lower side of the lens 8, FIG. 8 is a view of a vicinity of the injection port 48 of the cleaning nozzle unit 4 from a side of the lens 8.

As illustrated in FIG. 6, in the cleaning nozzle unit 4, in a front view of the lens 8, the two injection ports 48 are disposed at one section (upper side in the present embodiment) of two sections of the lens 8 divided by a horizontal line A1 passing through an apex O (corresponding to a center of the lens 8 in front view) of the lens 8. By the disposition, entrance of the injection ports 48 into an angle of the view of the on-vehicle camera 2 is suppressed, and sensing of a wide angle of view is realized, as compared with a configuration in which a plurality of injection ports 48 are disposed at appropriate intervals over an entire circumference of the lens 8.

In the present embodiment, in front view, the two injection ports 48 are disposed at the upper side of the above described horizontal line A1, and in positions where disposition angles α to a vertical line A2 passing through the apex O are 45 degrees. The respective injection ports 48 are provided in positions, with sizes and shapes so that entire openings of the injection ports 48 are within a thickness T of the lens 8 as illustrated in FIG. 7. In layout of the injection ports 48 and the lens 8 like this, the cleaning solution mist 47 is injected with a predetermined angle of elevation β toward the apex O of the lens 8 from the respective injection ports 48 as illustrated in FIG. 8. The angle of elevation β can be expressed by an angle formed by the front face 6A of the camera body case 6 to which the lens 8 is mounted and an injection direction B of the cleaning solution mist 47.

In this case, in front view, a range on the other side (lower side in the present embodiment) of the two divisions of the lens 8 by the horizontal line A1, of the surface 8A of the lens 8 does not face the injection port 48, and therefore, the cleaning solution mist 47 does not directly reach the range. Accordingly, unless any countermeasure is taken, dirt easily remains in a range (hereinafter, referred to as "range C close to the other side edge portion") close to an edge portion of the lens 8 in particular in this range even after washing. Further, when the on-vehicle camera unit 1 is installed in front of the vehicle, dirt or the like splashed by the preceding vehicle hits the lens 8 directly during traveling of the vehicle, and the dirt easily adheres to the lens 8 firmly, so that dirt easily remains in the range C close to the other side edge portion.

Therefore, in the present embodiment, a cleaning force for a range at a lower side from the horizontal line A1 of the lens 8 in front view, in particular, the range C close to the other side edge portion is enhanced, by a turbulent flow that occurs by collision (hits each other) of the cleaning solution mists 47 injected from the respective injection ports 48.

Describing in detail, the on-vehicle camera unit 1 of the present embodiment continuously injects the cleaning solution mists 47 in a fan shape in front view at a substantially same flow velocities from the respective injection ports 48 toward the apex O of the lens 8 as illustrated in FIG. 6 at a time of cleaning operation. The cleaning solution mist 47 is injected in the fan shape in front view, whereby the cleaning solution mist 47 advances to the apex O while washing the wide range of the surface 8A at the upper side from the apex O of the lens 8.

Thereafter, the cleaning solution mists 47 of a continuous flow rate collide with each other in the apex O, and thereby the turbulent flow in which the cleaning solution mist 47 flows to a lower pressure side continuously occurs in the range D in which collision of the cleaning solution mists 47 occurs in side view as schematically illustrated in FIG. 8. In this case, the directions where the pressure is low in the range D are two directions that are a direction to separate from the lens 8, and a direction to approach the lens 8, and therefore, the turbulent flow including a first air current E1 in the direction to separate from the lens 8, and a second air current E2 toward the lens 8 continuously occurs in the range D.

The second air current E2 generates the cleaning solution mist 47 at a high flow velocity toward the range C close to the other side edge portion, and dirt in the range C close to the other side edge portion is scraped out and cleaned by the cleaning solution mist 47. Thereby, a cleaning force of the range C close to the other side edge portion is enhanced.

Here, when the cleaning solution mists 47 injected from the respective injection ports 48 deviate from the apex O due to wind pressure of traveling wind and wind outside the vehicle at the time of traveling of the vehicle, the second air current E2 of the turbulent flow is weakened, and the cleaning force of the range C close to the other side edge portion is reduced. Therefore, a distance between the injection port 48 and the lens 8, and the flow velocity of the cleaning solution mist 47 at the time of injection are set at values with which the cleaning solution mist 47 reliably reaches the apex O against wind pressure of the traveling wind and wind outside the vehicle.

Further, as the disposition angles α of the two injection ports 48 become smaller, a downward force in front view in a composite vector of the cleaning solution mists 47 that collide at the apex O increases more, and more cleaning solution mists 47 flow in the direction. As a result, the second air current E2 is weakened, and the cleaning force in the range C close to the other side edge portion is reduced.

Accordingly, the disposition angles α of the two injection ports 48 are desirably certain angles or more, and it is confirmed that the range C close to the other side edge portion can be cleaned when the disposition angle α is at least 25 degrees or more (an angle formed by the two injection ports 48 is 50 degrees or more). In this case, an upper limit of the disposition angle α of each of the injection ports 48 is a maximum angle that generates a downward component in front view, that is, an angle of less than 90 degrees (an angle formed by the two injection ports 48 is less than 180 degrees), in the composite vector of the cleaning solution mists 47 that collide at the apex O.

Further, the number of injection ports 48 is not limited to two. In this case, each of the injection ports 48 is disposed in a position laterally symmetrical about the vertical line A2 in a range of an upper side of the horizontal line A1, in front view. In the on-vehicle camera unit 1, the cleaning solution mists 47 are injected from the respective injection ports 48 at a flow velocity with which downward components in front view are generated in the composite vector of the cleaning solution mists 47 that collide with each other at the apex O. In this case, the flow velocities of the respective cleaning solution mists 47 may be same, or may be different according to the injection ports 48.

However, as the number of injection ports 48 increases, control of the second air current E2 becomes difficult, and it is difficult to generate the second air current E2 with a desired strength. In other words, by adopting the two injection ports 48, the second air current E2 with a desired strength can be easily generated.

According to the present embodiment, the following effects are provided.

The cleaning nozzle unit 4 of the present embodiment is configured such that each of the injection ports 48 is disposed on the upper side from the apex O of the lens 8 in front view of the lens 8, and the cleaning solution mists 47 injected from the respective injection ports 48 collide with each other on the surface 8A of the lens 8.

According to the cleaning nozzle unit 4, a turbulent flow including the first air current E1 in the direction to separate from the lens 8, and the second air current E2 toward the lens 8 is generated in the range D where the cleaning solution mists 47 collide with each other. Therefore, the surface 8A of the lens 8 is cleaned by using the cleaning solution mists 47 generated by the second air current E2, and cleaning ability can be enhanced.

In the cleaning nozzle unit 4 of the present embodiment, the cleaning solution mists 47 collide with each other at the apex O of the lens 8, and therefore the range at the lower side from the apex O can be cleaned by the cleaning solution mist 47 that is generated by the second air current E2.

In the cleaning nozzle unit 4 of the present embodiment, the number of injection ports 48 is two, the angle formed by the two injection ports 48 seen from the apex O is 50 degrees or more, and is less than 180 degrees, and therefore the second air current E2 with the appropriate strength for cleaning of the range of the lower side from the apex O can be easily generated as compared with a configuration in which three or more injection ports 48 are provided.

The cleaning nozzle unit 4 of the present embodiment includes the inner liquid passage outlet 72 of the inner liquid passage 60, the tip end liquid passage 64 connecting the inner liquid passage outlet 72 and the injection port 48, and the lid body 80 that closes the inner liquid passage outlet 72, and opens the inner liquid passage outlet 72 by elastically deforming by hydraulic pressure of the cleaning solution when the cleaning solution is fed to the inner liquid passage 60.

Thereby, when only air is blown out from the injection port 48, the cleaning solution remaining in the inner liquid passage 60 can be prevented from leaking out and mixing into air. Accordingly, a situation can be prevented, in which when air is sprayed to the lens 8 and the water droplets on the surface 8A is blown away, new water droplets adhere to the surface 8A by air including the cleaning solution being sprayed.

The aforementioned embodiment only illustrates one aspect of the present invention, and it is possible to make modifications and applications arbitrarily within the range without departing from the gist of the present invention.

In the aforementioned embodiment, the cleaning device 20 sprays only air to the lens 8 at the time of water droplets removal operation, but the present invention is not limited to this, and the cleaning solution in a liquid state may be poured to the lens 8 from the injection port 48. As described above, water drainage to the lens contact portion 6A1 from the surface 8A of the lens 8 is favorable, so that when the cleaning solution poured to the lens 8 quickly advances to the lens contact portion 6A1, water droplets on the surface 8A of the lens 8 can be removed together.

In the aforementioned embodiment, the lens in the spherical shape is illustrated as the lens 8, but the surface 8A does not always have to be a complete spherical surface.

In the aforementioned embodiment, the example in which the on-vehicle camera unit 1 is disposed in front or in rear of the vehicle body has been explained, but the on-vehicle camera unit 1 may be disposed at a left side or a right side of the vehicle body. On the left side, and the right side of the vehicle body, traveling wind mainly advances from the front of the vehicle to the rear. Therefore, the on-vehicle camera unit 1 is preferably provided in an orientation in which the injection ports 48 are located at a windward side of the traveling wind, and the range C close to the other side edge portion is located at a lee side. Thereby, the injection direction of the cleaning solution mist 47 is matched with the direction of the traveling wind, and therefore the cleaning solution mist 47 does not collide at a side closer to the injection port 48 (side away from the range C close to the other side edge portion) than the apex O by being defeated by the wind pressure of the traveling wind.

In the aforementioned embodiment, directions such as horizontal, and vertical, various numeric values, and shapes do not consciously exclude these directions, a range of the periphery of the numeric values, and approximate shapes unless otherwise noted, and includes the peripheral range and the approximate shapes (a so-called equivalent range) as long as the same operation effect is provided, and as long as the values do not deviate from the critical significance.

REFERENCE SIGNS LIST

1 On-vehicle camera unit
2 On-vehicle camera
4 Cleaning nozzle unit
8 Lens
8A Surface of lens
20 Cleaning device
40 Unit body
46 Nozzle portion
46A Tip end portion
47 Cleaning solution mist (cleaning solution in a mist state)
48 Injection port
60 Inner liquid passage
61 Inner air passage
64 Tip end liquid passage
66 Tip end air passage
67 Tip end face
72 Inner liquid passage outlet
74 Inner air passage outlet
80 Lid body
81 Frame portion
82 Lid portion
83 Support portion
A1 Horizontal line
A2 Vertical line
B Injection direction
C Lower end side range
E1 First air current
E2 Second air current
O Apex
α Disposition angle
β Angle of elevation

What is claimed is:

1. A cleaning nozzle unit comprising:
an inner liquid passage guiding a cleaning solution;
inner air passages to feed and guide air; and
an injection port that mixes the cleaning solution guided by the inner liquid passage and the air fed by the inner air passages and injects a mixture of the cleaning solution and the air to a surface of an object, wherein
a plurality of the injection ports are provided, are disposed at predetermined intervals and inject the mixtures in directions such that at the surface, the mixtures hits each other at a substantially predetermined angle in a front view of the surface,
the cleaning nozzle unit further comprises:
tip end liquid passages and tip end air passages, wherein each tip end air passage and tip end liquid passage communicate with a respective one of the plurality of injection ports
the tip end liquid passages connect an outlet of the inner liquid passage and the respective injection ports; and
the tip end air passages connect outlets of the inner air passages and the respective injection ports in one to one correspondence,
the tip end liquid passages and the tip end air passages meet, respectively, at a junction before the respective injection ports,
a lid body is provided in the outlet of the inner liquid passage, the lid body closes the outlet of the inner liquid passage to inhibit outflow of the cleaning solution from the outlet of the inner liquid passage to the tip end liquid passages and opens the outlet of the inner liquid passage by elastically deforming by hydraulic pressure of the cleaning solution when the cleaning solution is fed to the inner liquid passage, and
the respective injection ports are provided vertically below the outlet of the inner liquid passage, and the tip end liquid passages are formed without providing a spot that guides the cleaning solution upward through a path of each of the tip end liquid passages so that the cleaning solution flows down only downward to the respective injection ports from the outlet of the inner liquid passage.

2. The cleaning nozzle unit according to claim 1,
wherein in a case that the cleaning nozzle unit is installed in an on-vehicle camera, the object is a lens of the on-vehicle camera, the lens having a spherical shape, and the plurality of injection ports are disposed at angles so that the mixtures hits each other at an apex of the lens.

3. The cleaning nozzle unit according to claim 2,
wherein a number of the plurality of injection ports is two, and
an angle formed by the two injection ports is 50 degrees or more, and less than 180 degrees seen from the apex of the lens.

4. An on-vehicle camera unit, comprising:
an on-vehicle camera having a spherical lens; and
the cleaning nozzle unit according to claim 1.

* * * * *